US010920053B2

(12) United States Patent
Abubakar et al.

(10) Patent No.: US 10,920,053 B2
(45) Date of Patent: Feb. 16, 2021

(54) PROPYLENE IMPACT COPOLYMER BLENDS WITH IMPROVED GLOSS

(71) Applicant: ExxonMobil Chemical Patents Inc., Baytown, TX (US)

(72) Inventors: Saifudin M. Abubakar, Shanghai (CN); Dan Peng, Singapore (CN); Li Yuan, Shanghai (CN); James P. Stokes, Katy, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 86 days.

(21) Appl. No.: 16/128,861

(22) Filed: Sep. 12, 2018

(65) Prior Publication Data
US 2019/0112460 A1 Apr. 18, 2019

Related U.S. Application Data

(60) Provisional application No. 62/572,590, filed on Oct. 16, 2017.

(51) Int. Cl.
*C08L 23/12* (2006.01)
*C08F 210/06* (2006.01)

(52) U.S. Cl.
CPC ............. *C08L 23/12* (2013.01); *C08F 210/06* (2013.01); *C08F 2500/15* (2013.01); *C08F 2500/16* (2013.01); *C08F 2800/20* (2013.01); *C08L 2205/025* (2013.01); *C08L 2205/03* (2013.01); *C08L 2207/02* (2013.01); *C08L 2207/10* (2013.01)

(58) Field of Classification Search
CPC ............... C08F 210/06; C08F 2800/20; C08F 2500/15; C08F 2500/16; C08L 23/14; C08L 23/16; C08L 23/12; C08L 2205/03; C08L 2205/025; C08L 2207/02; C08L 2207/10
See application file for complete search history.

(56) References Cited

U.S. PATENT DOCUMENTS

| | | |
|---|---|---|
| 4,735,988 A | 4/1988 | Takada et al. |
| 5,258,464 A | 11/1993 | McCullough, Jr. et al. |
| 6,087,459 A | 7/2000 | Miro et al. |
| 6,384,142 B1 | 5/2002 | Burkhardt et al. |
| 6,399,707 B1 | 6/2002 | Meka et al. |
| 7,309,742 B2 | 12/2007 | Poncelet et al. |
| 7,449,522 B2 | 11/2008 | Aguirre et al. |
| 7,935,766 B2 | 5/2011 | Sheard et al. |
| 7,977,435 B2 | 7/2011 | Lin et al. |
| 8,044,135 B2 | 10/2011 | Doufas et al. |
| 8,067,510 B2 | 11/2011 | Sheard et al. |
| 2009/0270545 A1 | 10/2009 | Sahnoune et al. |
| 2010/0105848 A1 | 4/2010 | Meka et al. |
| 2010/0152360 A1 | 6/2010 | Jiang et al. |
| 2014/0309359 A1 | 10/2014 | Jiang et al. |
| 2015/0024649 A1* | 1/2015 | Czaplewski et al. ... B32B 25/08 442/328 |
| 2017/0267794 A1 | 9/2017 | Lin et al. |

FOREIGN PATENT DOCUMENTS

| | | |
|---|---|---|
| EP | 0714923 | 6/1996 |
| EP | 0726292 | 8/1996 |
| EP | 1619217 | 1/2006 |
| WO | 87/05310 | 9/1987 |
| WO | 98/21275 | 5/1998 |
| WO | 99/20663 | 4/1999 |
| WO | 01/58970 | 8/2001 |
| WO | 03/044086 | 5/2003 |
| WO | 2016/207236 | 12/2016 |

OTHER PUBLICATIONS

Roe, "Surface Tension of Polymer Liquids," J. Phys. Chem., 1968, vol. 72, No. 6, pp. 2013-2017.

* cited by examiner

*Primary Examiner* — Nathan M Nutter

(57) ABSTRACT

Described herein are polymer blends comprising (a) a propylene impact copolymer comprising a polypropylene component present in a continuous phase and a first elastomeric component present in a disperse phase; and (b) a second elastomeric component, and the interfacial tension between the second elastomeric component and the impact copolymer is at least 1.2 mN/m. The polymer blends of present invention provides improved gloss and impact properties.

14 Claims, 3 Drawing Sheets

PROPYLENE IMPACT COPOLYMER BLENDS WITH IMPROVED GLOSS

CROSS-REFERENCE OF RELATED APPLICATIONS

This application claims the benefit of Provisional Application No. 62/572,590, filed Oct. 16, 2017, the disclosure of which is incorporated herein by reference.

FIELD OF THE INVENTION

This invention relates to blends comprising propylene impact copolymers and an elastomeric polymer, such as propylene-based elastomers, and in particular to such blends with improved gloss property.

BACKGROUND OF THE INVENTION

Commercial propylene impact copolymers, industrially referred to as heterophasic copolymers, block copolymers, or simply as "impact copolymers" (ICPs), are typically made in at least two stages series reactors, and typically are "propylene-based" meaning that propylene-derived comonomers or monomers predominate (i.e., greater than 50 wt. % propylene) in the ICP. The propylene monomer may be polymerized in slurry or gas phase process in the lead reactor. After the polymerization in the lead reactor, the porous polypropylene granules are stripped of the propylene monomer and transferred into a gas phase reactor where the propylene and ethylene comonomers are fed into the reactor to incorporate ethylene-propylene copolymer within the pores of the granules under fluidized conditions. ICP's comprise a polypropylene component, for example hPP, made in the lead reactor and a copolymer component, for example rubber-like ethylene-propylene copolymer ("EPR") made in the second reactor to form an intimate polymer blend. The polypropylene component is itself has low impact strength, but is markedly toughened by the presence of the rubber-like copolymer.

Patents and publications related to ICPs and their manufacture include US 2001-034411; US 2010-105848; U.S. Pat. Nos. 8,067,510; 8,044,135; 7,977,435; 7,935,766; 7,309,742; 7,449,522; 6,399,707; 6,384,142; 6,087,459; 5,258,464; WO 2001-58970; US 2004-092631; WO 2003-044086; WO 1999-20663; and WO 1998-21275.

ICPs with high gloss property are desired in some industries in appliances, consumer products and rigid packaging, for example, films, nonwovens, laminations. However, because of the limitations of commercially available catalyst systems presently available to incorporate ethylene-propylene copolymers in the homopolymer granules, the physical properties, in particular those related to the dispersion of the copolymers, such as gloss and room temperature notched Izod impact ("RTNI") that can be commercially achieved are also limited.

Publications related to high gloss ICPs and their manufacture includes U.S. Pat. No. 6,660,808 and WO 2015-108634, in which disclosed ICPs may have gloss at 60° of greater than 80.

This invention addresses the easy means to improve properties related to dispersion of the rubber-like components that accordingly exhibit improved properties related to dispersion of the copolymers, such as gloss and room temperature Izod impact while without compromising the stiffness (flexural modulus) of the resulting polymer blends by adding a finely selected second component, such as propylene-based elastomers.

SUMMARY OF THE INVENTION

The present invention in one aspect provides a polymer blend comprising (A) a propylene impact copolymer comprising a polypropylene component present in a continuous phase and a first elastomeric component present in a dispersed phase, and (B) a second elastomeric component, in which the interfacial tension between the propylene impact copolymer and the second elastomeric component is at least 2.7 mN/m, or at least 4.5 mN/m.

In some embodiments, the present polymer blends comprise 75 to 99 wt. % or 85 to 97 wt. % of the propylene impact copolymer and from 1 to 25 wt. %, or 3 to 15 wt. % of the second elastomeric component based on the weight of the polymer blend.

In some embodiments, the propylene impact copolymers comprise from 40 to 95 wt. %, or 40 to 90 wt. % polypropylene homopolymer and from 5 to 60 wt. %, or 10 to 30 wt. % an ethylene-propylene copolymer based on the weight of the propylene impact copolymer; and the ethylene-propylene copolymer comprises propylene-derived units and from 20 to 85 wt. %, or 30 to 60 wt. % units derived from ethylene and/or $C_4$ to $C_{12}$ α-olefins based on the weight of the ethylene-propylene copolymer. In the same or other embodiments, the propylene impact copolymer has an MFR at 190° C./2.16 kg of at least 2 g/10 min, preferably not higher than 10.0, or 9.0, or 8.0 g/10 min.

In some embodiments, the second elastomeric component comprises a propylene-based elastomer containing 75 to 97 wt. % of propylene-derived units and from 3 to 25 wt. % of ethylene and/or $C_4$-$C_{20}$ α-olefin derived units and has an mm propylene triad tacticity of at least 75%, and a heat of fusion of less than 75 J/g; or an ethylene-based plastomer containing 65 to 95 wt. % ethylene-derived units and from 5 to 35 wt. % 1-butene, 1-hexene, and/or 1-octene derived units based on the weight of the ethylene-based plastomer. In the same or other embodiments, the second elastomeric components have a melt flow rate at 230° C./2.16 kg of at least 1.0 g/10 min, preferably at least 8.0 g/10 min, for example from 2.0 to 50.0 g/10 min, such as from 10.0 to 50.0 g/10 min.

The present invention in another aspect provides a polymer blend comprising, based on the weight of the polymer blend, (a) 75 to 99 wt. % of a propylene impact copolymer; and (b) 1 to 25 wt. % of propylene-based elastomer, wherein the propylene impact copolymer comprises polypropylene homopolymer and from 10 to 30 wt. % an ethylene-propylene copolymer based on the weight of the propylene impact copolymer, and the ethylene-propylene copolymer comprises propylene-derived units and from 30 to 60 wt. % units derived from ethylene and/or $C_4$ to $C_{12}$ α-olefins based on the weight of the ethylene-propylene copolymer; wherein the propylene-based elastomer comprises from 75 to 97 wt. % propylene derived units and from 3 to 25 wt. % ethylene derived units based on the weight of the propylene-based elastomer, and has an mm propylene triad tacticity of at least 75%, and a heat of fusion of less than 75 J/g, and an melt flow rate at 230° C./2.16 kg of greater than 3.0 g/10 min; and wherein the interfacial tension between the propylene impact copolymer and the propylene-based elastomer is of at least 1.2 mN/m.

The present invention in still another aspect provides a polymer blend comprising, based on the weight of the polymer blend, (a) 75 to 99 wt. % of a propylene impact copolymer; and (b) 1 to 25 wt. % of propylene-based elastomer, wherein the propylene impact copolymer comprises polypropylene homopolymer and from 10 to 30 wt. % an ethylene-propylene copolymer based on the weight of the propylene impact copolymer, and the ethylene-propylene copolymer comprises propylene-derived units and from 30 to 60 wt. % units derived from ethylene and/or $C_4$ to $C_{12}$ α-olefins based on the weight of the ethylene-propylene copolymer; wherein the propylene-based elastomer comprises from 75 to 97 wt. % propylene derived units and from 3 to 25 wt. % ethylene derived units based on the weight of the propylene-based elastomer, and has an mm propylene triad tacticity of at least 75%, and a heat of fusion of less than 75 J/g; and wherein the interfacial tension between the propylene impact copolymer and the propylene-based elastomer is of at least 2.0 mN/m.

The present invention in still another aspect provides a method of improving the gloss of a propylene impact copolymer by providing the polymer blends of the present invention.

DETAILED DESCRIPTION OF THE INVENTION

Figure 1:
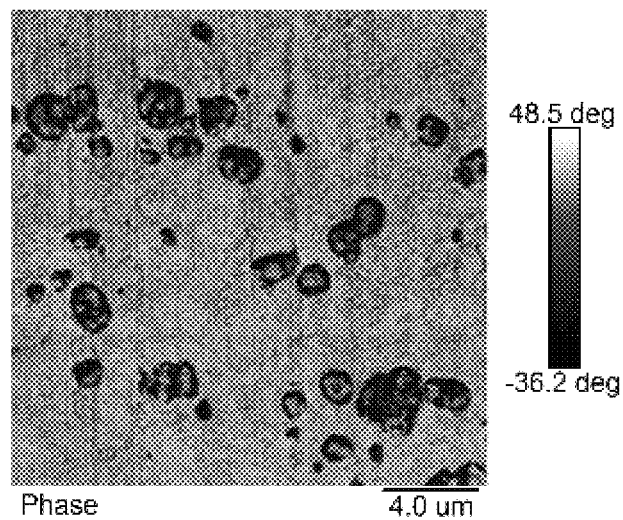
FIG. 1 shows the dispersion of EP rubber in pure ICP1, i.e., sample 1.

As used herein, the term "copolymer" is meant to include polymers having two or more monomers, optionally, with other monomers, and may refer to interpolymers, terpolymers, etc. The term "polymer" as used herein includes, but is not limited to, homopolymers, copolymers, terpolymers, etc., and alloys and blends thereof. The term "polymer" as used herein also includes impact, block, graft, random, and alternating to copolymers. The term "polymer" shall further include all possible geometrical configurations unless otherwise specifically stated. Such configurations may include isotactic, syndiotactic and random symmetries. The term "blend" as used herein refers to a mixture of two or more polymers. The term "elastomer" and "elastomeric component" shall mean any polymer exhibiting some degree of elasticity, where elasticity is the ability of a material that has been deformed by a force (such as by stretching) to return at least partially to its original dimensions once the force has been removed. The term "plastomer" and "plastomeric component" shall mean any polymer combining qualities of elastomers and plastics, exhibiting both elastic and plastic properties, and as such, in present disclosure, a plastomers and plastomeric components is within the scope of elastomers and elastomeric components.

The term "monomer" or "comonomer," as used herein, can refer to the monomer used to form the polymer, i.e., the unreacted chemical compound in the form prior to polymerization, and can also refer to the monomer after it has been incorporated into the polymer, also referred to herein as a "[monomer]-derived unit". Different monomers are discussed herein, including propylene monomers, ethylene monomers, and diene monomers.

"Polypropylene," as used herein, includes homopolymers and copolymers of propylene or mixtures thereof. Products that include one or more propylene monomers polymerized with one or more additional monomers may be more commonly known as random copolymers (RCP) or impact copolymers (ICP). Impact copolymers may also be known in the art as heterophasic copolymers.

"Reactor grade," as used herein, means a polymer that has not been chemically or mechanically treated or blended after polymerization in an effort to alter the polymer's average molecular weight, molecular weight distribution, or viscosity. Particularly excluded from those polymers described as reactor grade are those that have been visbroken or otherwise treated or coated with peroxide or other prodegradants. For the purposes of this disclosure; however, reactor grade polymers include those polymers that are reactor blends.

"Reactor blend," as used herein, means a highly dispersed and mechanically inseparable blend of two or more polymers produced in situ. For example, a reactor blend polymer may be the result of a sequential (or series) polymerization process where a first polymer component is produced in a first reactor and a second polymer component is produced in a second reactor in the presence of the first polymer component. Alternatively, a reactor blend polymer may be the result of a parallel polymerization process where the polymerization effluent containing the polymer components made in separate parallel reactors are solution blended to form the final polymer product. Reactor blends may be produced in a single reactor, a series of reactors, or parallel reactors and are reactor grade blends. Reactor blends may be produced by any polymerization method, including batch, semi-continuous, or continuous systems. Particularly excluded from "reactor blend" polymers are blends of two or more polymers in which the polymers are blended ex situ, such as by physically or mechanically blending in a mixer, extruder, or other similar device.

"Visbreaking," as used herein, is a process for reducing the molecular weight of a polymer by subjecting the polymer to chain scission. The visbreaking process also increases the MFR of a polymer and may narrow its molecular weight distribution. Several different types of chemical reactions can be employed for visbreaking propylene-based polymers. An example is thermal pyrolysis, which is accomplished by exposing a polymer to high temperatures, e.g., in an extruder at 270° C. or higher. Other approaches are exposure to powerful oxidizing agents and exposure to ionizing radiation. A commonly used method of visbreaking is the addition of a prodegradant to the polymer. A prodegradant is a substance that promotes chain scission when mixed with a polymer, which is then heated under extrusion conditions. Examples of prodegradants used in commercial practice are alkyl hydroperoxides and dialkyl peroxides. These materials, at elevated temperatures, initiate a free radical chain reaction resulting in scission of polypropylene molecules. The terms "prodegradant" and "visbreaking agent" are used interchangeably herein. Polymers that have undergone chain scission via a visbreaking process are said herein to be "visbroken." Such visbroken polymer grades, particularly polypropylene grades, are often referred to in the industry as "controlled rheology" or "CR" grades.

"Catalyst system," as used herein, means the combination of one or more catalysts with one or more activators and, optionally, one or more support compositions. An "activator" is any compound or component, or combination of compounds or components, capable of enhancing the ability of one or more catalysts to polymerize monomers to polymers.

As used herein, "nonwoven fabric" means a web structure of individual fibers or filaments that are interlaid, but not in an identifiable manner as in a knitted fabric.

The present invention discloses polymer blends comprising (A) a polypropylene impact copolymer containing a polypropylene component and a first elastomeric component and (B) a second elastomeric component, wherein the interfacial tension between the polypropylene impact copolymer and second elastomeric component is at least 2.7 mN/m, preferably greater than 5.0 mN/m.

As used herein, the interfacial tension can be measured according to Equation (1), described in *Calculation of Interfacial Tension in Polymer Systems*, Souheng Wu, J. POLYMER. SCI.: PART C, No. 34, pp. 19-30 (1971):

$$\gamma_{12} = \gamma_1 + \gamma_2 - \frac{4\gamma_1^d \gamma_2^d}{\gamma_1^d + \gamma_2^d} - \frac{4\gamma_1^p \gamma_2^p}{\gamma_1^p + \gamma_2^p}, \quad (1)$$

where $\gamma_{12}$ is the interfacial tension between polymer 1 and polymer 2, $\gamma_1$ and $\gamma_2$ are the surface tension of respective polymers 1 and 2, $\gamma_1^d$ and $\gamma_2^d$ are surface tension of dispersion component of respective polymers 1 and 2, and $\gamma_1^p$ and $\gamma_2^p$ are surface tension of polar component of respective polymers 1 and 2. As used herein, the surface tension of polymers 1 and 2, the dispersion component and the polar component are measured by the pendant-drop method as described in *Surface Tension of Polymer Liquids*, Ryong-Joon Roe, The Journal of Physical Chemistry, Volume 71, Number 6, June 1968, pp 2013-2017, in which the surface tension is given by Equation (2):

$$\gamma = g\rho d_e^2 / H, \quad (2)$$

where g is the gravitational acceleration, ρ is the density difference between the liquid and the surrounding medium, $d_e$ is the largest horizontal diameter of the drop, and 1/H is a correction factor depending on the shape of the drop. 1/H is characterized, as proposed originally by J. M. Andreas, E. A. Hauser, and W. B. Turker, ibid., 42, 1001 (1938), by the shape parameter S defined as the ratio $d_s/d_e$, where $d_s$ is the diameter of the drop measured at the horizontal plan at the height equal to $d_e$ from the vertex of the drop. Tables are available from S. Fordham, *Proc. Roy. Soc.* (London), A194, 1 (1948), and C. E. Stauffer, *J. Phys. Chem.*, 669, 1933 (1965).

It has been found when the interfacial tension between the propylene impact copolymer and an elastomeric component is at least 2.7 mN/m, the dispersion of discrete particles within the continuous phase of the impact copolymer becomes more even, resulting in improved properties related to the dispersion, for example, gloss and RTNI. Not to be bound by any theory, addition of such elastomeric component reduces the distribution of discrete particles on the surface of the propylene impact copolymer due to the increased interfacial tension.

It has also been found that blends of certain featured polypropylene impact copolymer and propylene-based elastomers can also improve the gloss and RTNI properties, indicating an interfacial tension of at least 2.7 mN/m. In these embodiments, the propylene impact copolymer comprises from 10 to 30 wt. % of the first elastomeric component based on the weight of the propylene impact copolymer, and has a melt flow rate at 230° C./2.16 kg of not higher than 10.0 g/10 min. In an embodiment, the first elastomeric component comprises propylene-derived units and from 30 to 60 wt. % units derived from ethylene and/or $C_4$ to $C_{12}$ α-olefins based on the weight of the first elastomeric component. In an embodiment, the propylene-based elastomer comprises from 75 to 97 wt. % propylene derived units and from 3 to 25 wt. % ethylene derived units based on the weight of the propylene-based elastomer, and has an mm propylene triad tacticity of at least 75%, and a heat of fusion of less than 75 J/g, and an melt flow rate at 230° C./2.16 kg of at least 8.0 g/10 min.

Useful polypropylene impact copolymers and the second elastomeric components will be described herein below in details.

Polypropylene Impact Copolymers

As used herein, the term "impact copolymer" and "propylene impact copolymer" and "polypropylene impact copolymer" ("ICP") are interchangeable and shall mean those blends comprising at least two components, i.e., polypropylene component ("Component A") and an elastomeric/rubber-like component ("Component B") and being substantially thermoplastic and having a high impact resistance, for example a flexural modulus measurable by ISO 178 method of greater than 250 MPa, or even greater than 500 MPa.

In preferred embodiments, Component A is a propylene homopolymer, and preferably an isotactic propylene homopolymer, although small amounts of a comonomer may be used to obtain particular properties. Typically such copolymers contain less than 10 wt. %, or less than 6 wt. %, or less than 4 wt. %, or less than 2 wt. %, or less than 1 wt. % of comonomer such as ethylene, butene, hexene, or octene. Preferably, the polymer component of Component A consists essentially of propylene-derived units and does not contain any comonomer except that which may be present due to impurities in the propylene feed stream. In some embodiments, Component A consists only of propylene-derived units.

Component A has a broad molecular weight distribution, Mw/Mn ("MWD"), of greater than 4.5, or greater than 5.0, or greater than 5.5, or greater than 6.0. Preferably, Component A has a MWD of less than 15.0, or less than 14.0, or less than 13.0, or less than 12.0, or less than 11.0, or less than 10.0, or less than 9.5, or less than 9.9. In some embodiments, Component A has a MWD in the range of from 4.5 to 15.0, or in the range of from 4.5 to 12.0, or in the range of from 5.0 to 10.0, or in the range of from 6.0 to 9.0. In certain embodiments, these molecular weight distributions are obtained in the absence of visbreaking using peroxide or other post reactor treatment designed to reduce molecular weight.

In some embodiments, Component A may have an Mz/Mw ratio of greater than or to equal to 2.5, or greater than or equal to 2.6, or greater than or equal to 2.7, or greater than or equal to 2.8, or greater than or equal to 2.9, or greater than or equal to 3.0, or greater than or equal to 3.1, or greater than or equal to 3.2. Component A may have an Mz/Mw ratio of less than or equal to 7.0, or less than or equal to 6.5, or less than or equal to 6.0, or less than or equal to 5.5, or less than or equal to 5.0.

Component A may have a weight average molecular weight (Mw, as determined by GPC) of less than 400,000, or less than 350,000, or less than 300,000, or less than 275,000, or less than 250,000.

Component A may have a melting point (Tm) of at least 150° C., preferably at least 155° C., most preferably at least 160° C. The melting point may be determined by differential scanning calorimetry (DSC), by taking a sample weight of 5-7 mg polymer and melting completely the polymer at 200° C. for a minute and then cooling at 10° C./min and recording the crystallization temperature, followed by melting endotherm under second heating cycle.

The melt flow rate ("MFR") of Component A may range from about 10 to about 500 g/10 min, or from about 12 to about 200 g/10 min, or from about 15 to about 175 g/10 min, or from about 20 to about 160 g/10 min, or from about 14 to about 150 g/10 min, or from about 30 to about 100 g/10 min. The MFR may be determined by ASTM-1238 measured at load of 2.16 kg and 230° C.

In preferred embodiments, Component B is a copolymer comprising propylene-derived units and comonomer-derived units. The comonomer is preferably ethylene, although other propylene copolymers or terpolymers may be suitable depending on the particular product properties desired. For example propylene/butene, hexene, or octene copolymers may be used.

Component B preferably comprises at least about 20 wt. % propylene, or at least about 30 wt. % propylene, or at least about 35 wt. % propylene, or at least about 40 wt. % propylene, or at least about 45 wt. % propylene, or at least about 50 wt. % propylene, or at least about 60 wt. % propylene. Component B may comprise less than about 90 wt. % propylene, or less than about 85 wt. % propylene, or less than about 80 wt. % propylene, or less than about 75 wt. % propylene, or less than about 70 wt. % propylene, or less than about 65 wt. % propylene. In some embodiments, Component B comprises from about 30 to about 80 wt. % propylene, or from about 35 to about 70 wt. % propylene, or from about 40 to about 65 wt. % propylene, or from about 60 to about 80 wt. %.

Component B preferably comprises at least about 20 wt. % comonomer, or at least about 25 wt. % comonomer, or at least about 30 wt. % comonomer, or at least about 35 wt. % comonomer, or at least about 40 wt. % comonomer, or at least about 45 wt. % comonomer. Component B may comprises less than about 85 wt. % comonomer, or less than about 80 wt. % comonomer, or less than about 75 wt. % comonomer, or less than about 70 wt. % comonomer, or less than about 65 wt. % comonomer, or less than about 60 wt. % comonomer, or less than about 55 wt. % comonomer. In some embodiments, Component B comprises from about 20 to about 80 wt. % comonomer, or from about 25 to about 75 wt. % comonomer, or from about 30 to about 70 wt. % comonomer, or from about 35 to about 65 wt. % comonomer, or from about 40 to about 60 wt. % comonomer, or from about 45 to about 55 wt. % comonomers, or from about 20 to about 45 wt. % comonomer. In certain embodiments, Component B may consist essentially of, or consist only of, propylene and ethylene-derived units in the above described amounts.

In one or more embodiments, Component B may have an intrinsic viscosity greater than about 1.00 dl/g, or greater than about 1.50 dl/g, or greater than about 1.75 dl/g. Component B may have an intrinsic viscosity of less than 5.00 dl/g, or less than 4.00 dl/g, or less than 3.50 dl/g. The term "intrinsic viscosity" or "IV" is used herein to mean the viscosity of a solution of polymer such as Component B in a given solvent at a given temperature, when the polymer composition is at infinite dilution. According to the ASTM D1601 standard, IV measurement utilizes a standard capillary viscosity measuring device, in which the viscosity of a series of concentrations of the polymer in the solvent at a given temperature are determined. For Component B, decalin is a suitable solvent and a typical temperature is 135° C. From the values of the viscosity of solutions of varying concentrations, the viscosity at infinite dilution can be determined by extrapolation.

The ICPs may comprise from about 40 to about 95 wt. % Component A and from about 5 wt. % to about 60 wt. % Component B, or from about 50 wt. % to about 90 wt. % Component A and from about 10 wt. % to about 50 wt. % Component B, or from about 60 wt. % to about 90 wt. % Component A and from about 10 wt. % to about 40 wt. % Component B, or from about 70 wt. % to about 85 wt. % Component A and from about 15 wt. % to about 30 wt. % Component B, where desirable ranges may include ranges from any of the above described lower limits to any upper limit. In some embodiments, the ICP may consist essentially of Components A and B.

The overall comonomer (e.g., ethylene) content of the ICP may be in the range of from about 3 wt. % to about 40 wt. %, or from about 5 wt. % to about 25 wt. %, or from about 6 wt. % to about 20 wt. %, or from about 7 wt. % to about 15 wt. %, where desirable ranges may include ranges from any lower limit to any upper limit.

The melt flow rate ("MFR") of the ICPs suitable for use herein may range from about 1 to about 1000 g/10 min, or from about 1 to about 500 g/10 min, or from about 1 to about 50 g/10 min, or from about 1 to about 25 g/10 min, or from about 1 to about 20 g/10 min, or from about 1 to 10 g/10 min, where desirable ranges may include ranges from any lower limit to any upper limit. The MFR may be determined by ASTM-1238 measured at load of 2.16 kg and 230° C. In some preferred embodiment, the MFR of the ICPs can be not higher than 10 g/10 min.

The ICPs suitable for use in the polymer blends of the present invention may, in some embodiments, be reactor blends, meaning that Components A and B are not physically or mechanically blended together after polymerization but are interpolymerized in at least one reactor, often in two or more reactors in series. The final ICP as obtained from the reactor or reactors, however, can be blended with various other components including other polymers or additives. In other embodiments, however, the ICPs described herein may be formed by producing Components A and B in separate reactors and physically blending the components once they have exited their respective reactors.

In one or more embodiments herein, the ICPs may be described as "heterophasic." As used herein, heterophasic means that the polymers have two or more phases. Commonly, heterophasic ICPs comprise a matrix component in one phase and an elastomeric component phase, for example rubber phase, dispersed within the matrix. In one or more embodiments herein, the ICPs comprise a matrix phase comprising a propylene homopolymer (Component A) and a dispersed phase comprising a propylene-ethylene copolymer (Component B). The copolymer component (Component B) has rubbery characteristics and provides impact resistance, while the matrix component (Component A) provides overall stiffness.

A variety of additives may be incorporated into the ICP for various purposes. For example, such additives include, but are not limited to, stabilizers, antioxidants, fillers, colorants, nucleating agents, and mold release agents. Primary and secondary antioxidants include, for example, hindered phenols, hindered amines, and phosphates. Nucleating agents include, for example, sodium benzoate, and talc. Dispersing agents such as Acrowax C can also be included.

Slip agents include, for example, oleamide, and erucamide. Catalyst deactivators are also commonly used, for example, calcium stearate, hydrotalcite, and calcium oxide.

The ICP compositions suitable for use in the present invention may be prepared by conventional polymerization techniques. For example, the ICP may be produced using a two-step gas phase process using Ziegler-Natta catalysis, an example of which is described in U.S. Pat. No. 4,379,759. The ICPs for use in the invention may also be produced in reactors operated in series. In such series operations, the first polymerization (polymerization of Component A) may be a liquid slurry or solution polymerization process, and the second polymerization (polymerization of Component B) may be carried out in the gas phase. In one or more embodiments, hydrogen may be added to one or both reactors to control molecular weight, IV, and/or MFR. The use of hydrogen for such purposes is well known to those skilled in the art.

In some embodiments, the ICP is prepared using a Ziegler-Natta catalyst system with a blend of electron donors as described in U.S. Pat. No. 6,087,459 or US 2010-0105848. In some embodiments, the ICP may be prepared using a succinate Ziegler-Natta type catalyst system.

Metallocene-based catalyst systems may also be used to produce the ICP compositions described herein. Current particularly suitable metallocenes are those in the generic class of bridged, substituted bis(cyclopentadienyl) metallocenes, specifically bridged, substituted bis(indenyl) metallocenes known to produce high molecular weight, high melting, highly isotactic propylene polymers. Generally speaking, those of the generic class disclosed in U.S. Pat. No. 5,770,753 are suitable.

Second Elastomeric Component

The second elastomeric component ("SEC") useful in the present invention can be any polymers showing an elasticity and provides certain interfacial tension with the ICP. In some embodiments the SEC can be a propylene-based elastomer ("PBE") or an ethylene-based plastomer ("EBP"), and the interfacial tension between the ICP and SEC can be at least 2.7 mN/m. In some embodiments the SEC is a PBE, as described herein below, and the interfacial tension between the ICP and the PBE is at least 2.0 Mn/m. In further embodiments, the PBE may have a melt flow rate of at least 8.0 g/10 min and the interfacial intension can be at least 1.2 mN/m. Now PBEs and EBPs will be described in detail. However, one of ordinary skills in the art will understand that the useful second elastomeric component of the present invention are not limited to the below described PBEs and EBPs, but shall include any elastomeric or plastomeric polymer, such as propylene-based plastomers, ethylene-based elastomers, butene-based elastomers etc., as long as they can provide an interfacial intension with the ICP of at least about 2.7 mN/m, or at least about 3.0 mN/m, or at least about 3.5 mN/m, or at least about 4.0 mN/m, or at least about 4.5 mN/m, or at least about 5.0 mN/m. Propylene-Based Elastomers The polymer blends may comprise one or more propylene-based elastomers ("PBEs"). The PBE comprises propylene and from about 3 to about 25 wt. % of one or more comonomers selected from ethylene and/or $C_4$-$C_{12}$ α-olefins. The α-olefin comonomer units may be derived from ethylene, butene, pentene, hexene, 4-methyl-1-pentene, octene, or decene. In preferred embodiments the α-olefin is ethylene. In some embodiments, the propylene-based polymer composition consists essentially of propylene and ethylene, or consists only of propylene and ethylene. The embodiments described below are discussed with reference to ethylene as the α-olefin comonomer, but the embodiments are equally applicable to other copolymers with other α-olefin comonomers. In this regard, the copolymers may simply be referred to as propylene-based polymers with reference to ethylene as the α-olefin.

The PBE may include at least about 3 wt. %, or at least about 5 wt. %, at least about 6 wt. %, at least about 7 wt. %, or at least about 8 wt. %, or at least about 9 wt. %, or at least about 10 wt. %, or at least about 12 wt. % ethylene-derived units, where the percentage by weight is based upon the total weight of the propylene-derived and ethylene-derived units. The PBE may include up to about 30 wt. %, or up to about 25 wt. %, or up to about 22 wt. %, or up to about 20 wt. %, or up to about 19 wt. %, or up to about 18 wt. %, or up to about 17 wt. % ethylene-derived units, where the percentage by weight is based upon the total weight of the PBE. In some embodiments, the PBE may comprise from about 3 wt. % to about 25 wt. % ethylene-derived units, or from about 7 wt. % to about 20 wt. % ethylene, or from about 9 wt. % to about 18 wt. % ethylene-derived units, where the percentage by weight is based upon the total weight of the PBE.

The PBE may include at least about 70 wt. %, or at least about 75 wt. %, or at least about 80 wt. %, or at least about 81 wt. % propylene-derived units, or at least about 82 wt. %, or at least about 83 wt. % propylene-derived units, where the percentage by weight is based upon the total weight of the propylene-derived and α-olefin derived units. The PBE may include up to about 97 wt. %, or up to about 95 wt. %, or up to about 94 wt. %, or up to about 93 wt. %, or up to about 92 wt. %, or up to about 90 wt. %, or up to about 88 wt. % propylene-derived units, where the percentage by weight is based upon the total weight of the propylene-derived and α-olefin derived units. In some embodiments, the PBE may comprise from about 75 wt. % to about 97 wt. % propylene-derived units, or from about 80 wt. % to about 93 wt. % propylene-derived units, or from about 82 wt. % to about 91 wt. % propylene-derived units, where the percentage by weight is based upon the total weight of the PBE.

The PBEs of one or more embodiments are characterized by a melting point (Tm), which can be determined by differential scanning calorimetry (DSC). For purposes herein, the maximum of the highest temperature peak is considered to be the melting point of the polymer. A "peak" in this context is defined as a change in the general slope of the DSC curve (heat flow versus temperature) from positive to negative, forming a maximum without a shift in the baseline where the DSC curve is plotted so that an endothermic reaction would be shown with a positive peak. The Tm of the PBE (as determined by DSC) may be less than about 115° C., or less than about 110° C., or less than about 100° C., or less than about 95° C., or less than about 90° C. In some embodiments, the PBE may have two melting peaks as determined by DSC. In other embodiments, the PBE may have a single melting peak as determined by DSC.

The PBE may be characterized by its heat of fusion (Hf), as determined by DSC. The PBE may have an Hf that is at least about 0.5 J/g, or at least about 1.0 J/g, or at least about 1.5 J/g, or at least about 3.0 J/g, or at least about 4.0 J/g, or at least about 5.0 J/g, or at least about 6.0 J/g, or at least about 7.0 J/g. The PBE may be characterized by an Hf of less than about 75 J/g, or less than about 70 J/g, or less than about 60 J/g, or less than about 50 J/g, or less than about 45 J/g, or less than about 40 J/g, or less than about 35 J/g, or less than about 30 J/g, or less than 25 J/g.

As used within this specification, DSC procedures for determining Tm and Hf include the following. From about 6 mg to about 10 mg of a sheet of the polymer pressed at approximately 200° C. to 230° C. is removed with a punch die. This is annealed at room temperature for at least 2 weeks. As used herein, the term "room temperature" is used to refer to the temperature range of about 20° C. to about 23.5° C. At the end of this period, the sample is placed in a Differential Scanning calorimeter (TA Instruments Model 2920 DSC) and cooled to about −50° C. to about −70° C. at a cooling rate of about 10° C./min. The sample is heated at 10° C./min to attain a final temperature of about 200° C. to about 220° C. The thermal output is recorded as the area under the melting peak of the sample which is typically peaked at about 30° C. to about 175° C. and occurs between the temperatures of about 0° C. and about 200° C. is a measure of the heat of fusion expressed in Joules per gram of polymer. The melting point is recorded as the temperature of the greatest heat absorption within the range of melting of the sample.

The PBE can have a triad tacticity of three propylene units (mmm tacticity), as measured by 13C NMR, of 75% or greater, 80% or greater, 85% or greater, 90% or greater, 92% or greater, 95% or greater, or 97% or greater. In one or more embodiments, the triad tacticity may range from about 75 to about 99%, or from about 80 to about 99%, or from about 85 to about 99%, or from about 90 to about 99%, or from about 90 to about 97%, or from about 80 to about 97%, where desirable ranges may include ranges from any lower limit to any upper limit. Triad tacticity is determined by the methods described in U.S. Pat. No. 7,232,871.

The PBE may have a tacticity index m/r ranging from a lower limit of 4 or 6 to an upper limit of 8 or 10 or 12. The tacticity index, expressed herein as "m/r", is determined by $^{13}$C nuclear magnetic resonance ("NMR"). The tacticity index, m/r, is calculated as defined by H. N. Cheng in Vol. 17, MACROMOLECULES, pp. 1950-1955 (1984), incorporated herein by reference. The designation "m" or "r" describes the stereochemistry of pairs of contiguous propylene groups, "m" referring to meso and "r" to racemic. An m/r ratio of 1.0 generally describes a syndiotactic polymer, and an m/r ratio of 2.0 describes an atactic material. An isotactic material theoretically may have a ratio approaching infinity, and many by-product atactic polymers have sufficient isotactic content to result in ratios of greater than 50.

The PBE may have a % crystallinity of from about 0.5% to about 40%, or from about 1% to about 30%, or from about 5% to about 25%, where desirable ranges may include ranges from any lower limit to any upper limit, determined according to DSC procedures. Crystallinity may be determined by dividing the Hf of a sample by the Hf of a 100% crystalline polymer, which is assumed to be 189 J/g for isotactic polypropylene or 350 J/g for polyethylene.

The PBE may have a density of from about 0.85 g/cm$^3$ to about 0.92 g/cm$^3$, or from about 0.86 g/cm$^3$ to about 0.90 g/cm$^3$, or from about 0.86 g/cm$^3$ to about 0.89 g/cm$^3$ at room temperature, as measured per the ASTM D-792 test method, where desirable ranges may include ranges from any lower limit to any upper limit.

The PBE can have a melt index (MI) (ASTM D-1238, 2.16 kg @ 190° C.), of less than or equal to about 100 g/10 min, or less than or equal to about 50 g/10 min, or less than or equal to about 25 g/10 min, or less than or equal to about 10 g/10 min, or less than or equal to about 9.0 g/10 min, or less than or equal to about 8.0 g/10 min, or less than or equal to about 7.0 g/10 min.

The PBE may have a melt flow rate (MFR), as measured according to ASTM D-1238 (2.16 kg weight @ 230° C.), greater than about 1 g/10 min, or greater than about 2 g/10 min, or greater than about 5 g/10 min, or greater than about 8 g/10 min, or greater than about 10 g/10 min. The PBE may have an MFR less than about 500 g/10 min, or less than about 400 g/10 min, or less than about 300 g/10 min, or less than about 200 g/10 min, or less than about 100 g/10 min, or less than about 75 g/10 min, or less than about 50 g/10 min In some embodiments, the PBE may have an MFR at least about 8 g/10 min, or at least about 10 g/10 min, for example from about 8 to about 100 g/10 min, or from about 10 to about 75 g/10 min, or from about 15 to about 50 g/10 min, or from about 15 to about 30 g/10 min.

In some embodiments, the PBE may be a reactor grade polymer, as defined above. In other embodiments, the PBE may be a polymer that has been visbroken after exiting the reactor to increase the MFR. "Visbreaking" as used herein is a process for reducing the molecular weight of a polymer by subjecting the polymer to chain scission. The visbreaking process also increases the MFR of a polymer and may narrow its molecular weight distribution.

The PBE may have a g' index value of 0.95 or greater, or at least 0.97, or at least 0.99, wherein g' is measured at the Mw of the polymer using the intrinsic viscosity of isotactic polypropylene as the baseline. For use herein, the g' index is defined as:

$$g' = \frac{\eta_b}{\eta_l},$$

where ηb is the intrinsic viscosity of the polymer and ηl is the intrinsic viscosity of a linear polymer of the same viscosity-averaged molecular weight (Mv) as the polymer. ηl=KMvα, K and a are measured values for linear polymers and should be obtained on the same instrument as the one used for the g' index measurement.

The PBE may have a weight average molecular weight (Mw) of from about 50,000 to about 5,000,000 g/mol, or from about 75,000 to about 1,000,000 g/mol, or from about 100,000 to about 500,000 g/mol, or from about 125,000 to about 300,000 g/mol, where desirable ranges may include ranges from any lower limit to any upper limit.

The PBE may have a number average molecular weight (Mn) of from about 2,500 to about 2,500,000 g/mole, or from about 5,000 to about 500,000 g/mole, or from about 10,000 to about 250,000 g/mole, or from about 25,000 to about 200,000 g/mole, where desirable ranges may include ranges from any lower limit to any upper limit.

The PBE may have a Z-average molecular weight (Mz) of from about 10,000 to about 7,000,000 g/mole, or from about 50,000 to about 1,000,000 g/mole, or from about 80,000 to about 700,000 g/mole, or from about 100,000 to about 500,000 g/mole, where desirable ranges may include ranges from any lower limit to any upper limit.

The molecular weight distribution (MWD, equal to Mw/Mn) of the PBE may be from about 1 to about 40, or from about 1 to about 15, or from about 1.8 to about 5, or from about 1.8 to about 3, where desirable ranges may include ranges from any lower limit to any upper limit.

Optionally, the propylene-based polymer compositions may also include one or more dienes. The term "diene" is defined as a hydrocarbon compound that has two unsaturation sites, i.e., a compound having two double bonds connecting carbon atoms. Depending on the context, the term "diene" as used herein refers broadly to either a diene monomer prior to polymerization, e.g., forming part of the polymerization medium, or a diene monomer after polymerization has begun (also referred to as a diene monomer unit or a diene-derived unit). Exemplary dienes include, but are not limited to, butadiene, pentadiene, hexadiene (e.g., 1,4-hexadiene), heptadiene (e.g., 1,6-heptadiene), octadiene (e.g., 1,6-octadiene, or 1,7-octadiene), nonadiene (e.g., 1,8-nonadiene), decadiene (e.g., 1,9-decadiene), undecadiene (e.g., 1,10-undecadiene), dodecadiene (e.g., 1,11-dodecadiene), tridecadiene (e.g., 1,12-tridecadiene), tetradecadiene (e.g., 1,13-tetradecadiene), pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and polybutadienes having a molecular weight (Mw) of less than 1000 g/mol. Examples of branched chain acyclic dienes include, but are not limited to, 5-methyl-1,4-hexadiene, 3,7-dimethyl-1,6-octadiene, and 3,7-dimethyl-1,7-octadiene. Examples of single ring alicyclic dienes include, but are not limited to, 1,4-cyclohexadiene, 1,5-cyclooctadiene, and 1,7-cyclododecadiene. Examples of multi-ring alicyclic fused and bridged ring dienes include, but are not limited to, tetrahydroindene; norbornadiene; methyltetrahydroindene; dicyclopentadiene; bicyclo(2.2.1)hepta-2,5-diene; and alkenyl-, alkylidene-, cycloalkenyl-, and cylcoalkylidene norbornenes [including, e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to, vinyl cyclohexene, allyl cyclohexene, vinylcyclooctene, 4-vinylcyclohexene, allyl cyclodecene, vinylcyclododecene, and tetracyclododecadiene. In some embodiments of the present invention, the diene is selected from 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopentadiene (DCPD), and combinations thereof. In embodiments where the propylene-based polymer compositions comprises a diene, the diene may be present at from 0.05 wt. % to about 6 wt. % diene-derived units, or from about 0.1 wt. % to about 5.0 wt. % diene-derived units, or from about 0.25 wt. % to about 3.0 wt. % diene-derived units, or from about 0.5 wt. % to about 1.5 wt. % diene-derived units, where the percentage by weight is based upon the total weight of the propylene-derived, alpha-olefin derived, and diene-derived units.

In one or more embodiments, the PBE can optionally be grafted (i.e., "functionalized") using one or more grafting monomers. As used herein, the term "grafting" denotes covalent bonding of the grafting monomer to a polymer chain of the PBE. The grafting monomer can be or include at least one ethylenically unsaturated carboxylic acid or acid derivative, such as an acid anhydride, ester, salt, amide, imide, acrylates, or the like. Illustrative monomers include, but are not limited to, acrylic acid, methacrylic acid, maleic acid, fumaric acid, itaconic acid, citraconic acid, mesaconic acid, maleic anhydride, 4-methyl cyclohexene-1,2-dicarboxylic acid anhydride, bicyclo(2.2.2)octene-2,3-dicarboxylic acid anhydride, 1,2,3,4,5,8,9,10-octahydronaphthalene-2,3-dicarboxylic acid anhydride, 2-oxa-1,3-diketospiro(4.4)nonene, bicyclo(2.2.1)heptene-2,3-dicarboxylic acid anhydride, maleopimaric acid, tetrahydrophthalic anhydride, norbornene-2,3-dicarboxylic acid anhydride, nadic anhydride, methyl nadic anhydride, himic anhydride, methyl himic anhydride, and 5-methylbicyclo(2.2.1)heptene-2,3-dicarboxylic acid anhydride. Other suitable grafting monomers include methyl acrylate and higher alkyl acrylates, methyl methacrylate and higher alkyl methacrylates, acrylic acid, methacrylic acid, hydroxy-methyl methacrylate, hydroxylethyl methacrylate and higher hydroxy-alkyl methacrylates and glycidyl methacrylate. Maleic anhydride is a preferred grafting monomer. In one or more embodiments, the grafted PBE comprises from about 0.5 to about 10 wt. % ethylenically unsaturated carboxylic acid or acid derivative, more preferably from about 0.5 to about 6 wt. %, more preferably from about 0.5 to about 3 wt. %; in other embodiments from about 1 to about 6 wt. %, more preferably from about 1 to about 3 wt. %. In a preferred embodiment wherein the graft monomer is maleic anhydride, the maleic anhydride concentration in the grafted polymer is preferably in the range of about 1 to about 6 wt. %, preferably at least about 0.5 wt. %, and highly preferably about 1.5 wt. %.

In some embodiments, the PBE is a reactor blend of a first polymer component and a second polymer component. Thus, the comonomer content of the PBE can be adjusted by adjusting the comonomer content of the first polymer component, adjusting the comonomer content of second polymer component, and/or adjusting the ratio of the first polymer component to the second polymer component present in the propylene-based polymer composition. In such embodiments, the first polymer component may comprise propylene and ethylene and have an ethylene content of greater than 10 wt. % ethylene, or greater than 12 wt. % ethylene, or greater than 13 wt. % ethylene, or greater than 14 wt. % ethylene, or greater than 15 wt. % ethylene, and an ethylene content that is less than 20 wt. % ethylene, or less than 19 wt. % ethylene, or less than 18 wt. % ethylene, or less than 17 wt. % ethylene, or less than 16 wt. % ethylene, where the percentage by weight is based upon the total weight of the propylene-derived and ethylene derived units of the first polymer component. In such embodiments, the second polymer component may comprise propylene and ethylene and have an ethylene content of greater than 2 wt. % ethylene, or greater than 3 wt. % ethylene, or greater than 4 wt. % ethylene, or greater than 5 wt. % ethylene, or greater than 6 wt. % ethylene, and an ethylene content that is less than 10 wt. % ethylene, or less than 9.0 wt. % ethylene, or less than 8 wt. % ethylene, or less than 7 wt. % ethylene, or less than 6 wt. % ethylene, or less than 5 wt. % ethylene, where the percentage by weight is based upon the total weight of the propylene-derived and ethylene derived units of the second polymer component. In such embodiments, the PBE may comprise from 3-25 wt. % of the second polymer component, or from 5-20 wt. % of the second polymer component, or from 7-18 wt. % of the second polymer component, or from 10-15 wt. % of the second polymer component, and from 75 to 97 wt. % of the first polymer component, or from 80 to 95 wt. % of the first polymer component, or from 82 to 93 wt. % of the first polymer component, or from 85 to 90 wt. % of the first polymer component, based on the weight of the PBE, where desirable ranges may include ranges from any lower limit to any upper limit.

Polymerization of the PBE can be conducted by reacting monomers in the presence of a catalyst system described herein at a temperature of from 0° C. to 200° C. for a time of from 1 second to 10 hours. Preferably, homogeneous conditions are used, such as a continuous solution process or a bulk polymerization process with excess monomer used as diluent. The continuous process may use some form of agitation to reduce concentration differences in the reactor and maintain steady state polymerization conditions. The heat of the polymerization reaction is preferably removed by cooling of the polymerization feed and allowing the polymerization to heat up to the polymerization, although internal cooling systems may be used. Further description of exemplary methods suitable for preparation of the PBEs described herein may be found in U.S. Pat. Nos. 6,881,800; 7,803,876; 8,013,069; and 8,026,323.

The triad tacticity and tacticity index of the PBE may be controlled by the catalyst, which influences the stereoregularity of propylene placement, the polymerization temperature, according to which stereoregularity can be reduced by increasing the temperature, and by the type and amount of a comonomer, which tends to reduce the level of longer propylene derived sequences.

Too much comonomer may reduce the crystallinity provided by the crystallization of stereoregular propylene derived sequences to the point where the material lacks strength; too little and the material may be too crystalline. The comonomer content and sequence distribution of the polymers can be measured using $^{13}C$ nuclear magnetic resonance (NMR) by methods well known to those skilled in the art. Comonomer content of discrete molecular weight ranges can be measured using methods well known to those skilled in the art, including Fourier Transform Infrared Spectroscopy (FTIR) in conjunction with samples by GPC, as described in Wheeler and Willis, Applied Spectroscopy, 1993, Vol. 47, pp. 1128-1130. For a propylene ethylene copolymer containing greater than 75 wt. % propylene, the comonomer content (ethylene content) of such a polymer can be measured as follows: A thin homogeneous film is pressed at a temperature of about 150° C. or greater, and mounted on a Perkin Elmer PE 1760 infrared spectrophotometer. A full spectrum of the sample from 600 cm−1 to 4000 cm−1 is recorded and the monomer weight percent of ethylene can be calculated according to the following equation: Ethylene wt. %=82.585−111.987X+30.045X2, where X is the ratio of the peak height at 1155 cm−1 and peak height at either 722 cm−1 or 732 cm−1, whichever is higher. For propylene ethylene copolymers having 75 wt. % or less propylene content, the comonomer (ethylene) content can be measured using the procedure described in Wheeler and Willis. Reference is made to U.S. Pat. No. 6,525,157, whose test methods are also fully applicable for the various measurements referred to in this specification and claims and which contains more details on GPC measurements, the determination of ethylene content by NMR and the DSC measurements.

The catalyst may also control the stereoregularity in combination with the comonomer and the polymerization temperature. The PBEs described herein are prepared using one or more catalyst systems. As used herein, a "catalyst system" comprises at least a transition metal compound, also referred to as catalyst precursor, and an activator. Contacting the transition metal compound (catalyst precursor) and the activator in solution upstream of the polymerization reactor or in the polymerization reactor of the disclosed processes yields the catalytically active component (catalyst) of the catalyst system. Such catalyst systems may optionally include impurity scavengers.

The catalyst systems used for producing the PBE may comprise a metallocene compound. In some embodiments, the metallocene compound is a bridged bisindenyl metallocene having the general formula $(In^1)Y(In^2)MX_2$, where $In^1$ and $In^2$ are (preferably identical) substituted or unsubstituted indenyl groups bound to M and bridged by Y, Y is a bridging group in which the number of atoms in the direct chain connecting $In^1$ with $In^2$ is from 1 to 8 and the direct chain comprises C or Si, and M is a Group 3, 4, 5, or 6 transition metal. $In^1$ and $In^2$ may be substituted or unsubstituted. If $In^1$ and $In^2$ are substituted by one or more substituents, the substituents are selected from the group consisting of a halogen atom, $C_1$ to $C_{10}$ alkyl, $C_5$ to $C_{15}$ aryl, $C_6$ to $C_{25}$ alkylaryl, and N- or P-containing alkyl or aryl. Exemplary metallocene compounds include, but are not limited to, μ-dimethyl-silylbis(indenyl)hafniumdimethyl and μ-dimethylsilylbis(indenyl)zirconiumdimethyl, and in particular (μ-dimethyl-silyl)bis(2-methyl-4-(3,'5'-di-tert-butylphenyl) indenyezirconiumdimethyl, (2-methyl-4-(3,'5'-di-tert-butylphenyl)indenyehafniumdimethyl, (μ-dimethyl-silyl)bis (2-methyl-4-naphthylindenyl)zirconiumdimethyl, (μ-dimethylsilyl)bis(2-methyl-4-naphthylindenyl)hafniumdimethyl, (μ-dimethylsilyl)bis(2-methyl-4-(N-carbazyl)indenyl)-zirconiumdimethyl, and (μ-dimethylsilyl)bis(2-methyl-4-(N-carbazyl)indenyl)-hafniumdimethyl.

Alternatively, the metallocene compound may correspond to one or more of the formulas disclosed in U.S. Pat. No. 7,601,666. Such metallocene compounds include, but are not limited to, dimethylsilyl bis(2-(methyl)-5,5,8,8-tetramethyl-5,6,7,8-tetrahydrobenz(f)indenyl)hafnium dimethyl, diphenylsilyl bis(2-(methyl)-5,5,8,8-tetramethyl-5,6,7,8-tetrahydrobenz(f)indenyl)-hafnium dimethyl, diphenylsilyl bis (5,5,8,8-tetramethyl-5,6,7,8-tetrahydrobenz(f)indenyl)-hafnium dimethyl, diphenylsilyl bis(2-(methyl)-5,5,8,8-tetramethyl-5,6,7,8-tetrahydrobenz(f) indenyl)zirconium dichloride, and cyclo-propylsilyl bis(2-(methyl)-5,5,8,8-tetramethyl-5,6,7,8-tetrahydrobenz(f) indenyl)hafnium dimethyl.

The activators of the catalyst systems used to produce PBE may comprise a cationic component. In some embodiments, the cationic component has the formula $[R^1R^2R^3AH]^+$, where A is nitrogen, $R^1$ and $R^2$ are together a $—(CH_2)_a—$ group, where a is 3, 4, 5, or 6, and form, together with the nitrogen atom, a 4-, 5-, 6-, or 7-membered non-aromatic ring to which, via adjacent ring carbon atoms, optionally, one or more aromatic or heteroaromatic rings may be fused, and $R^3$ is $C_1$, $C_2$, $C_3$, $C_4$, or $C_5$ alkyl, or N-methylpyrrolidinium or N-methylpiperidinium. In other embodiments, the cationic component has the formula $[R_nAH]^+$, where A is nitrogen, n is 2 or 3, and all R are identical and are $C_1$ to $C_3$ alkyl groups, such as, for example, trimethylammonium, trimethylanilinium, triethylammonium, dimethylanilinium, or dimethylammonium.

In one or more embodiments, the activators of the catalyst systems used to produce the propylene-based polymer compositions comprise an anionic component, $[Y]^-$. In some embodiments, the anionic component is a non-coordinating anion (NCA), having the formula $[B(R^4)_4]^-$, where $R^4$ is an aryl group or a substituted aryl group, of which the one or more substituents are identical or different and are selected from the group consisting of alkyl, aryl, a halogen atom, halogenated aryl, and haloalkylaryl groups. In one or more embodiments, the substituents are perhalogenated aryl groups, or perfluorinated aryl groups, including but not limited to perfluorophenyl, perfluoronaphthyl and perfluorobiphenyl.

Together, the cationic and anionic components of the catalysts systems described herein form an activator compound. In one or more embodiments of the present invention, the activator may be N,N-dimethylanilinium-tetra(perfluorophenyl)borate, N,N-dimethylanilinium-tetra (perfluoronaphthyl)borate, N,N-dimethylanilinium-tetrakis (perfluoro-biphenyl)borate, N,N-dimethylanilinium-tetrakis (3,5-bis(trifluoromethyl)phenyl)borate, triphenylcarbenium-tetra(perfluorophenyl)borate, triphenylcarbenium-tetra (perfluoro-naphthyl)borate, triphenylcarbenium-tetrakis (perfluorobiphenyl)borate, or triphenylcarbenium-tetrakis(3, 5-bis(trifluoromethyl)phenyl)borate.

Any catalyst system resulting from any combination of a metallocene compound, a cationic activator component, and an anionic activator component mentioned in the preceding paragraphs shall be considered to be explicitly disclosed herein and may be used in accordance with the present invention in the polymerization of one or more olefin monomers. Also, combinations of two different activators can be used with the same or different metallocene(s).

Further, the catalyst systems may contain, in addition to the transition metal compound and the activator described above, additional activators (co-activators) and/or scavengers. A co-activator is a compound capable of reacting with the transition metal complex, such that when used in combination with an activator, an active catalyst is formed. Co-activators include alumoxanes and aluminum alkyls.

In some embodiments, scavengers may be used to "clean" the reaction of any poisons that would otherwise react with the catalyst and deactivate it. Typical aluminum or boron alkyl components useful as scavengers are represented by the general formula $R^xJZ_2$ where J is aluminum or boron, $R^x$ is a $C_1$-$C_{20}$ alkyl radical, for example, methyl, ethyl, propyl, butyl, pentyl, and isomers thereof, and each Z is independently $R^x$ or a different univalent anionic ligand such as halogen (Cl, Br, I), alkoxide ($OR^x$) and the like. Exemplary aluminum alkyls include triethylaluminum, diethylaluminum chloride, ethylaluminum dichloride, tri-iso-butylaluminum, tri-n-octylaluminum, tri-n-hexylaluminum, trimethylaluminum, and combinations thereof. Exemplary boron alkyls include triethylboron. Scavenging compounds may also be alumoxanes and modified alumoxanes including methylalumoxane and modified methylalumoxane.

Ethylene-Based Plastomers

As described herein, the term "plastomer" is a copolymer having a density in the range of about 0.850 to 0.915 gm/cm³, for example, an ethylene-based plastomer ("EBP") comprising about 60 to about 99 wt. %, or about 65 to about 95 wt. %, or about 70 to about 90 wt. % ethylene-derived units and about 1 to about 40 wt. %, or about 5 to about 35 wt. %, or about 10 to about 30 wt. % units derived from at least one of $C_3$ to $C_8$ α-olefin, in particular 1-butene, 1-hexene, and/or 1-octene, based on the weight of the plastomer.

Useful EBPs may have one or more of the following properties:

i. density of about 0.915 g/cm³ or less (preferably about 0.910 g/cm³ or less, or about 0.905 g/cm³ or less, or about 0.902 g/cm³ or less; or preferably about 0.85 g/cm³ or more, or about 0.86 g/cm³ or more, or about 0.87 g/cm³ or more, or about 0.88 g/cm³ or more, or about 0.885 g/cm³ or more, or preferably from about 0.85 to about 0.915 g/cm³, or from about 0.86 to about 0.91 g/cm³, or from about 0.87 to about 0.91 g/cm³, or from about 0.88 to about 0.905 g/cm³, or from about 0.88 to about 0.902 g/cm³, or from about 0.885 to about 0.902 g/cm³);

ii. heat of fusion ($H_f$) of about 90 J/g or less (preferably about 70 J/g or less, or about 50 J/g or less, or about 30 J/g or less, or preferably from about 10 to about 70 J/g, or from about 10 to about 50 J/g, or from about 10 to about 30 J/g);

iii. crystallinity of about 40% or less (preferably about 30% or less, or about 20% or less, preferably at least about 5%, or in the range of from about 5 to about 30%, or from about 5 to about 20%);

iv. melting point ($T_m$, peak first melt) of about 100° C. or less (preferably about 95° C. or less, or about 90° C. or less, or about 80° C. or less, or about 70° C. or less, or about 60° C. or less, or about 50° C. or less);

v. crystallization temperature ($T_c$, peak) of about 90° C. or less (preferably about 80° C. or less, or about 70° C. or less, or about 60° C. or less, or about 50° C. or less, or about 40° C. or less);

vi. glass transition temperature ($T_g$) of about −20° C. or less (preferably about −30° C. or less, or about −40° C. or less);

vii. $M_w$ of about 30 to about 2,000 kg/mol (preferably about 50 to about 1,000 kg/mol, or about 90 to about 500 kg/mol);

viii. $M_w/M_n$ of about 1 to about 40 (preferably about 1.4 to about 20, or about 1.6 to about 10, or about 1.8 to about 3.5, or about 1.8 to about 2.5);

ix. branching index (g') about 1.4 to about 20 (preferably about 1.6 to about 10, or about 1.8 to about 10);

x. melt index (MI, 2.16 kg at 190° C.) of about 0.1 to about 100 g/10 min (preferably about 0.3 to about 60 g/10 min, or about 0.5 to about 40 g/10 min, or about 0.7 to about 20 g/10 min); and/or xi. CDBI of at least about 60 wt. % (preferably at least 70 wt. %, or at least about 80 wt. %, or at least about 90 wt. %, or at least about 95 wt. %).

The method of making the EBPs can be slurry, solution, gas-phase, high-pressure, or other suitable processes, through the use of catalyst systems appropriate for the polymerization of polyolefins, such as Ziegler-Natta catalysts, metallocene catalysts, other appropriate catalyst systems, or combinations thereof.

Useful EBPs may be produced using a metallocene catalyst system, i.e., a mono- or bis-cyclopentadienyl transition metal catalysts in combination with an activator of alumoxane and/or a non-coordinating anion in solution, slurry, high-pressure, or gas-phase. The catalyst and activator may be supported or unsupported and the cyclopentadienyl rings by may substituted or unsubstituted. Information on the methods and catalysts/activators to produce such mPE homopolymers and copolymers is available in WO 1994/26816; WO 1994/03506; U.S. Pat. Nos. 5,153,157; 5,198,401; 5,240,894; 5,017,714; CA 1,268,753; U.S. Pat. Nos. 5,324,800; 5,264,405; WO 1992/00333; U.S. Pat. Nos. 5,096,867; 5,507,475; WO 1991/09882; WO 1994/03506; and U.S. Pat. No. 5,055,438. More generally, preferred plastomers are produced using a single-site catalyst, whether a metallocene catalyst or not, and have an Mw/Mn of 1.5 to 3 (preferably 1.8 to 2.5) and a CDBI of 70% or more (preferably 80% or more, or 90% or more).

Plastomers that are useful in this invention include those commercially available under the trade names EXACT™ (ExxonMobil Chemical Company), AFFINITY™, ENGAGE™, FLEXOMER™ (The Dow Chemical Company), QUEO™ (Borealis AG, Austria), and TAFMER™ (Mitsui Company).

Polymer Blends

In embodiments where the blend comprises an ICP and a PBE and/or EBP, the blend may comprise from about 75 to about 99 wt. % ICP, or from about 80 to about 97 wt. % ICP, or from about 83 to about 96 wt. % ICP, or from about 85 to about 95 wt. % ICP, where desirable ranges may include ranges from any lower limit to any upper limit. The blends may comprise from about 1 to about 25 wt. % PBE and/or EBP, or from about 3 to about 20 wt. % PBE and/or EBP, or from about 4 to about 17 wt. % PBE and/or EBP, or from about 5 to about 15 wt. % PBE and/or EBP, where desirable ranges may include ranges from any lower limit to any upper limit. Stated differently, the blends may comprise greater than about 1 wt. % PBE and/or EBP, or greater than about 2 wt. % PBE and/or EBP, or greater than about 3 wt. % PBE and/or EBP, or greater than about 4 wt. % PBE and/or EBP, or greater than about 5 wt. % PBE and/or EBP, or greater than about 10 wt. % PBE and/or EBP.

A variety of additives may be incorporated into the polymer blends described herein, depending upon the intended purpose. For example, when the blends are used to form fibers and nonwoven fabrics, such additives may include but are not limited to, stabilizers, antioxidants, fillers, colorants, nucleating agents, dispersing agents, mold release agents, slip agents, fire retardants, plasticizers, pigments, vulcanizing or curative agents, vulcanizing or curative accelerators, cure retarders, processing aids, tackifying resins, and the like. Other additives may include fillers and/or reinforcing materials, such as carbon black, clay, talc, calcium carbonate, mica, silica, silicate, combinations thereof, and the like. Primary and secondary antioxidants include, for example, hindered phenols, hindered amines, and phosphates. Nucleating agents include, for example, sodium benzoate and talc. Also, to improve crystallization rates, other nucleating agents may also be employed such as Ziegler-Natta olefin products or other highly crystalline polymers. Other additives such as dispersing agents, for example, Acrowax C, can also be included. Slip agents include, for example, oleamide and erucamide. Catalyst deactivators are also commonly used, for example, calcium stearate, hydrotalcite, and calcium oxide, and/or other acid neutralizers known in the art.

Further, in some exemplary embodiments, additives may be incorporated into the polymer blends directly or as part of a masterbatch, i.e., an additive package containing several additives to be added at one time in predetermined proportions. In one or more embodiments herein, the fiber of the present invention further comprise a masterbatch comprising a slip agent. The masterbatch may be added in any suitable amount to accomplish the desired result. For example, a masterbatch comprising a slip additive may be used in an amount ranging from about 0.1 to about 10 wt. %, or from about 0.25 to about 7.5 wt. %, or from about 0.5 to about 5 wt. %, or from about 1 to about 5 wt. %, or from about 2 to about 4 wt. %, based on the total weight of the polymer blend and the masterbatch. In an embodiment, the masterbatch comprises erucamide as the slip additive.

The polymer blends can be made by any known method. Mixing techniques common in the art are useful, such as the use of a Brabender or Banbury mixer, or a screw-type extruder, or other suitable blender. For reactor ICPs, the PBE/EBP can be incorporated into the composition by addition of plastomer pellets immediately upstream of the pelletizing extruder. Alternatively, it can be added by the ICP producer or by a compounder in a compounding step after production of the ICP, or by the converter in a blending process prior to fabricating the end product. For compounded blends, the PBE/EBP can be added at the time of melt blending. Alternatively, the PBE/EBP can be pre-blended with the rubber component, with the rubber-plastomer blend later being compounded with the polypropylene in producing compounded ICP/PBE/EBP compositions.

In the present polymer blends, at least a portion of the SEC is included into the continuous polypropylene matrix of the ICP. In some embodiments, substantially all of the SEC is included in the continuous matrix. In some embodiments, at least a portion of the SEC is included into the EP phase of the ICP. In another embodiment, at least a portion of the SEC forms a separate discrete SEC phases within the ICP in addition to the discrete EP phase of the ICP. In an embodiment, PBE-type SECs may enter the polypropylene continuous phase of the ICP, whereas EBP-type SECs will not enter the continuous phase. In an embodiment, EBP-type SECs enter the EP rubber phase and/or form a separate phase.

The polymer blends of the present invention can have a gloss at 60° of at least about 75, or at least about 80, or at least about 85, or at least about 88, or at least about 90. The gloss at 60° is measured according to ISO 7668. In the same or other embodiments the gloss at 60° of the polymer blends comprising the ICP and SEC is at least about 5%, or at least about 8%, or at least about 10%, higher than the gloss at 60° of the ICP comprised in the polymer blends.

The polymer blends of the present invention can have a room temperature notched Izod impact (RTNI) of at least about 5 kJ/m$^2$, or at least about 7 kJ/m$^2$, or at least about 10 kJ/m$^2$, or at least about 15 kJ/m$^2$. The RTNI is measured according to ISO 180. The polymer blends of the present invention can have a room temperature notched Izod impact (RTNI) that is at least about 10%, or at least about 15%, or at least about 20%, or at least about 25%, or at least about 30%, or at least about 50%, or at least about 60%, or at least about 80% higher than the RTNI of the ICP comprised in the polymer blends.

The polymer blends of the present invention can have a flexural modulus at 1% secant, representing the stiffness, of at least about 250 MPa, or at least about 500 MPa, or at least about 750 MPa, or at least about 800 MPa, or at least about 1000 MPa. The flexural modulus at 1% secant is measured according to ISO 178 at conditions 2 mm/min.

The polymer blends of the present invention can have a melt flow rate (MFR) of at least about 5 g/10 min, or at least about 8 g/10 min, or at least about 10 g/10 min, or at least about 13 g/10 min, or at least about 15 g/10 min. The MFR is measured according to ISO 1133 or ASTM D-1238, at 230° C. using a 2.16 kg load. In the same or other embodiments the MFR of the polymer blends comprising the ICP and SEC is at least about 10%, or at least about 15%, or at least about 20%, or at least about 25%, or at least about 30% higher than the gloss at 60° of the ICP comprised in the polymer blends. This indicates an improvement on processability of the present polymer blends compared with the ICP.

Industrial Applications

The polymer blends can be used in preparation of articles that have desired high gloss for application in appliances, consumer products and rigid packaging, for example, films, nonwoven fabrics, layers, laminations.

Examples

In order to provide a better understanding of the foregoing discussion, the following non-limiting examples are offered. Although the examples may be directed to specific embodiments, they are not to be viewed as limiting the invention in any specific respect. All parts, proportions, and percentages are by weight unless otherwise indicated.

The following test methods were used in the Examples.

The melt flow rate (MFR) was measured according to ISO1133, at 230° C. using a 2.16 kg load. The MFR is reported in "g/10 min."

The gloss was measured according to ISO7668 at 60°.

The flexural modulus at 1% secant was measured according to ISO178 with conditions of 2 mm/min, and reported in "MPa".

The room temperature notched Izod impact (RNTI) was measured according to ISO 180, and reported in "kJ/m$^2$".

The hot deformation temperature (HDT) was measured according to ISO75 at conditions of 0.45 MPa, unannealed, and reported in "° C."

Table 1 shows the ICPs used in the examples. Each ICP used was a reactor blend of a polypropylene homopolymer component and an ethylene-propylene copolymer component (EP rubber) and is available from ExxonMobil Chemical Company, TX, USA.

TABLE 1

ICP Compositions

| ICP Sample # | MFR (230° C., 2.16 kg; g/10 min) | Density (g/cm³) |
|---|---|---|
| ICP1* | 10 | 0.900 |
| ICP2* | 8 | 0.900 |
| ICP3 | 11 | 0.900 |

*ICP1: ExxonMobil ™ AP3N polymer; ICP2: ExxonMobil ™ PP7033E3 polymer.

Table 2 shows the PBEs used in the examples. Each PBE used was a propylene-ethylene copolymer and is available from ExxonMobil Chemical Company, TX, USA.

TABLE 2

PBE Compositions

| PBE Sample # | MFR (230° C., 2.16 kg; g/10 min) | Ethylene-derived units content (wt. %) | Density (g/cm³) |
|---|---|---|---|
| PBE1* | 20 | 15 | 0.863 |
| PBE2* | 8 | 4 | 0.899 |
| PBE3* | 3 | 16 | 0.862 |
| PBE4** | —** | 6 | 0.879 |

*PBE1: Vistamaxx ™ 6202 polymer; PBE2: Vistamaxx ™ 3588 polymer; and PBE3: Vistamaxx ™ 6102 polymer
**PBE4: Vistamaxx ™ 8880 polymer, its MFR was too low to be measured.

Table 3 shows the EBPs used in the examples. Each EBP used was an ethylene-butene copolymer and is available from ExxonMobil Chemical Company, TX, USA.

TABLE 3

EBP Compositions

| EBP Sample # | Melt Index (190° C., 2.16 kg; g/10 min) | Density (g/cm³) |
|---|---|---|
| EBP1* | 0.55 | 0.863 |
| EBP2* | 4.8 | 0.873 |

*EBP1: Exact ™ 9061 polymer; EBP2: Exact ™ 9371 polymer

Interfacial Tension of ICP and SEC

The surface tension of each ICP and SEC (PBE and EBP) in Tables 1-3, and their respective disperse component and polar component were measured by the following method and then the interfacial tension between ICP and SEC in mN/m was calculated according to Equation (1) and shown in Table 4.

Contact angle was measured by Drop Shape Analysis (DSA) in a sessile drop mold with a DSA 100 Drop Shape Analyzer (software version 1.92.1.1) available from Kruss GmbH, Germany. The measurement was carried out under room temperature (23° C.). The water and diiodomethane were used as wetting solvent (3 ml/time) to measure the contact angle of polymers with polar and dispersion (non-polar) components. All results were the mean value of 5 replicates. The surface intension and its polar component and dispersion component of materials were calculated from the contact angle measured by the software installed in the Drop Shape Analyzer. The harmonic-mean equation was used to calculate the respective interfacial tensions. The results of contact angle and surface tension are shown in Table 4, and the interfacial tension between ICPs and SECs are shown in Table 5.

TABLE 4

Contact Angles and Surface Tension of Polymers

| | Contact angle (°) | | Surface tension (mN/m) | | |
|---|---|---|---|---|---|
| Polymers | Water | Diiodomethane | Total ($\gamma$) | Dispersion Component ($\gamma^d$) | Polar Component ($\gamma^p$) |
| ICP1 | 97.5 | 43.8 | 37.99 | 37.82 | 0.17 |
| ICP2 | 98.7 | 48.1 | 35.57 | 35.39 | 0.19 |
| ICP3 | 90.2 | 49.1 | 34.91 | 33.20 | 1.72 |
| EBP1 | 92.9 | 57.2 | 30.41 | 28.61 | 1.80 |
| EBP2 | 90.0 | 48.7 | 35.11 | 33.38 | 1.73 |
| PBE1 | 82.6 | 52.3 | 34.63 | 29.88 | 4.76 |
| PBE2 | 80.8 | 43.6 | 38.95 | 34.70 | 4.25 |
| PBE3 | 88.1 | 49.2 | 35.06 | 32.72 | 2.34 |
| PBE4 | 109.1 | 46.2 | 38.97 | 38.56 | 0.40 |

TABLE 5

Interfacial Tension between ICP and SEC

| | PBE1 | PBE2 | PBE3 | PBE4 | EBP1 | EBP2 |
|---|---|---|---|---|---|---|
| ICP1 | 5.19 | 3.90 | 2.24 | 0.11 | 2.63 | 1.56 |
| ICP2 | 4.66 | 3.71 | 1.92 | 0.21 | 2.01 | 1.28 |
| ICP3 | 1.58 | 1.10 | 0.09 | 1.22 | 0.33 | 0.01 |

Example 1

Polymer blends of ICPs and PBEs were prepared in accordance with the formulations as shown in Table 6. The ICPs and PBEs were melt blended in a Brabender mixer. The composition and properties of the resulting polymer blends are shown in Table 6.

TABLE 6

Compositions and Properties of Polymer Blends

| Blend Sample No. | ICP, Wt. % | SEC, Wt. % | Gloss | MFR (g/10 min) | Flexural Modulus 1% Secant (MPa) | RTNI (kJ/m²) | HDT (unannealed, ° C.) |
|---|---|---|---|---|---|---|---|
| 1 | ICP1, 100% | 0 | 80.3 | 11.7 | 1550 | 9.17 | 101 |
| 2 | ICP1, 90% | PBE1, 10% | 89 | 15.6 | 1117 | 16.76 | 82.67 |

TABLE 6-continued

Compositions and Properties of Polymer Blends

| Blend Sample No. | ICP, Wt. % | SEC, Wt. % | Gloss | MFR (g/10 min) | Flexural Modulus 1% Secant (MPa) | RTNI (kJ/m$^2$) | HDT (unannealed, °C.) |
|---|---|---|---|---|---|---|---|
| 3 | ICP1, 95% | PBE4, 5% | 82 | 18 | 1377 | 7.8 | 89.83 |
| 4 | ICP1, 90% | PBE4, 10% | 85.2 | 21.8 | 1278 | 7.75 | 84.63 |
| 5 | ICP1, 90% | PBE1 and PBE4, 5% each | 87 | 18.4 | 1213 | 10.6 | 87.17 |
| 6 | ICP3, 100% | 0 | 90.3 | 11.9 | 1704 | 7.18 | 106.87 |
| 7 | ICP3, 90% | PBE1, 10% | 90.2 | 13.2 | 1277 | 9.60 | 89.6 |
| 8 | ICP3, 95% | PBE4, 5% | 90.1 | 15.9 | 1502 | 6.56 | 97.1 |
| 9 | ICP3, 90% | PBE4, 10% | 90.7 | 19.3 | 1373 | 6.38 | 88.23 |
| 10 | ICP3, 90% | PBE1 and PBE4, 5% each | 91 | 15.9 | 1280 | 8.05 | 88.5 |

It can be seen from Table 6 that samples 2 to 5 and samples 7 to 10, which were blends of ICPs with PBE1 and/or PBE4, had improved gloss properties, and a melt flow rate indicating improved processability as compared to ICP-only samples 1 and 6.

Figure 2:
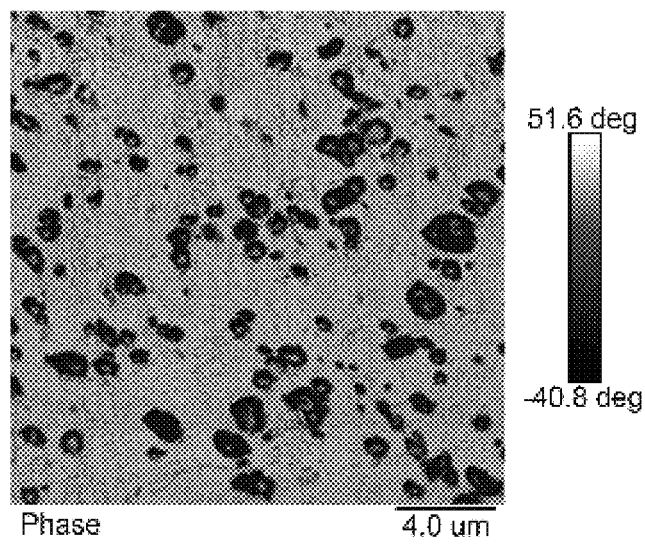
FIG. 2 shows the dispersion of EP rubber in polymer blend of sample 2.
Figure 3:
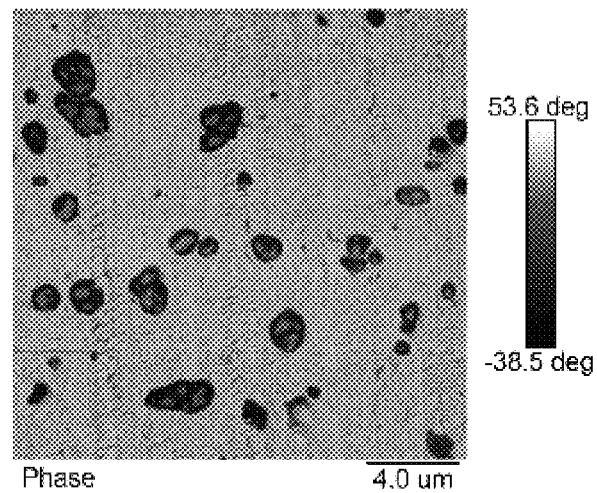
FIG. 3 shows the dispersion of EP rubber in polymer blend of sample 4.

FIG. 1 shows an atomic force microscope (AFM) image of pure ICP1. The EP rubber phase (dark portion) is dispersed within in the continuous polypropylene phase (light portion), FIG. 2 shows an AFM image of the polymer blend of sample 2, and FIG. 3 shows an AFM image of the polymer blend of sample 4. It can be seen that compared to ICP1, samples 2 and 4 had an improved dispersion of the EP rubber phases within the continuous matrix phase. In particular, sample 2, which comprised blends of ICP1 and PBE1, showed significantly improved dispersion of the EP rubber within the continuous matrix phase, which was also reflected by improvement on RTNI (>80%).

Figure 4:
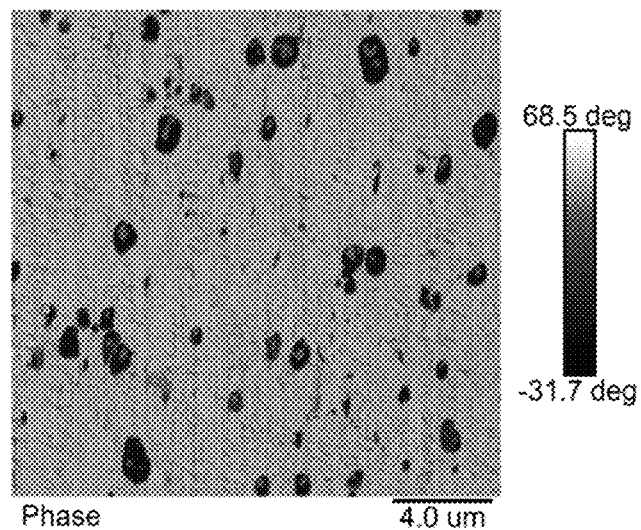
FIG. 4 shows the dispersion of EP rubber in pure ICP3 of sample 6.
Figure 5:
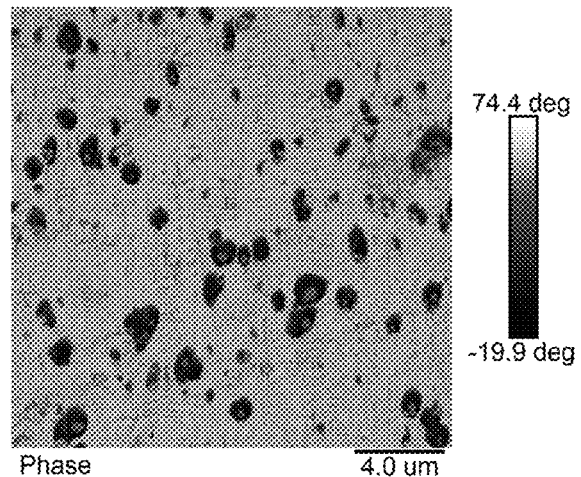
FIG. 5 shows the dispersion of EP rubber in polymer blend of sample 7.
Figure 6:
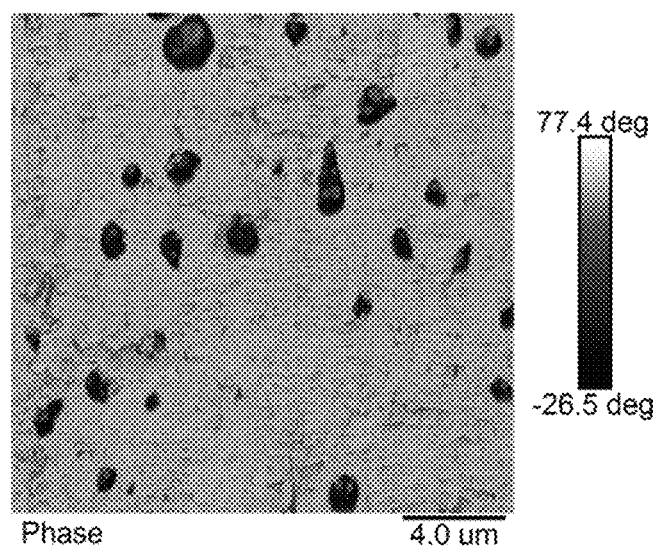
FIG. 6 shows the dispersion of EP rubber in polymer blend of sample 9.

FIG. 4 shows an AFM image of pure ICP3 (sample 6), FIG. 5 shows an AFM image of polymer blend sample 7, and FIG. 6 shows an AFM image of polymer blend sample 9. Sample 7, which included ICP3 blended with PBE1, had improved dispersion of the EP rubber phase as compared to pure ICP3, while sample 9, which included ICP3 blended with PBE4, did not show significant improvement on dispersion of the EP rubber phase as compared to pure ICP3. As shown in Table 5, the interfacial tensions between ICPs and PBE1 are higher than that between ICPs and PBE4.

It can also be seen from Table 6 that the RTNI of samples 2 and 7 showed more improved RTNI, as demonstrated by the finer, more uniform, and more even dispersion of EP rubbers in the polymer blends as compared to samples 3, 4, 8 and 9. Samples 3, 4, 8 and 9 were each blended with PBE4, which has a lower MFR than PBE1.

Example 2

In example 2, more polymer blends were made according to the same method as that used in example 1 and the gloss of the resulting polymer blends was measured. Compositions and gloss are shown in Table 7.

TABLE 7

Compositions and Gloss of Polymer Blends

| Blend Sample No. | ICP, Wt. % | SEC, Wt. % | Gloss |
|---|---|---|---|
| 11 | ICP1, 100% | 0 | 79 |
| 12 | ICP1, 90% | PBE3, 10% | 81.5 |
| 13 | ICP1, 90% | PBE2, 10% | 85.1 |
| 14 | ICP1, 90% | PBE1, 10% | 86.1 |
| 15 | ICP1, 90% | EBP1, 10% | 67 |
| 16 | ICP1, 90% | EBP2, 10% | 76.4 |
| 17 | ICP2, 100% | 0 | 73.2 |
| 18 | ICP2, 90% | PBE3, 10% | 66.6 |
| 19 | ICP2, 90% | PBE2, 10% | 74.9 |
| 20 | ICP2, 90% | PBE1, 10% | 78.4 |
| 21 | ICP2, 90% | EBP1, 10% | 61.4 |
| 22 | ICP2, 90% | EBP2, 10% | 63.1 |
| 23 | ICP3, 100% | 0 | 88.3 |
| 24 | ICP3, 90% | PBE3, 10% | 89.3 |
| 25 | ICP3, 90% | PBE2, 10% | 86.6 |
| 26 | ICP3, 90% | PBE1, 10% | 89.2 |
| 27 | ICP3, 90% | EBP1, 10% | 39.1 |
| 28 | ICP3, 90% | EBP2, 10% | 78.3 |

The data in Table 7 illustrate that when interfacial tension between an ICP and an SEC is greater than 2.7 Mn/m, the resulting polymer blends, for example, samples 13 to 14 and 19 to 20 had an improved gloss as compared to the pure ICPs.

The data in Table 7 further illustrate that when the SEC is a propylene-based elastomer and the interfacial tension between the ICP and the SEC is greater than 2.0 mN/m for example, samples 12 to 14 and 19 to 20 the resulting polymer blends had improved gloss as compared to the pure ICPs.

The data in Table 7 further illustrate that when the SEC is a propylene-based to elastomer having an MFR of at least 8.0 g/10 min and the interfacial tension between the SEC and ICP is greater than 1.2 mN/m for example, samples 13 to 14 and 19 to 20 and 24 the resulting polymer blends had improved gloss as compared to the pure ICPs.

For purposes of convenience, various specific test procedures are identified above for determining certain properties. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures can yield different results or measurements. Thus, a person of ordinary skill in the art is to expect experimental variations in measured properties that are reflected in the claims.

Having described the various aspects of the compositions herein, further specific embodiments of the invention include those set forth in the following paragraphs.

Embodiment A: A polymer blend comprise a propylene impact copolymer comprising a polypropylene component present in a continuous phase and a first elastomeric component present in a disperse phase, and a second elastomeric components, wherein the interfacial tension between them is of at least 1.2 mN/m.

Embodiment B: The polymer blend of Embodiment A, wherein the interfacial tension between the propylene impact copolymer and the elastomeric components is at least 2.7.

Embodiment C: The polymer blend of Embodiment A or B, wherein the interfacial tension is at least 4.5 mN/m.

Embodiment D: The polymer blend of any one of Embodiments A to C comprising from 75 to 99 wt. % of the propylene impact copolymer and from 1 to 25 wt. % of the second elastomeric component based on the weight of the polymer blend.

Embodiment E: The polymer blend of any one of Embodiments A to D comprising from 85 to 97 wt. % the propylene impact copolymer and from 3 to 15 wt. % the second elastomeric component based on the weight of the polymer blend.

Embodiment F: The polymer blend of any one of Embodiments A to E, wherein the propylene impact copolymer comprises from 40 to 95 wt. % polypropylene homopolymer and from 5 to 60 wt. % an ethylene-propylene copolymer based on the weight of the propylene impact copolymer; and the ethylene-propylene copolymer comprises propylene-derived units and from 20 to 85 wt. % units derived from ethylene and/or $C_4$ to $C_{12}$ α-olefins based on the weight of the ethylene-propylene copolymer.

Embodiment G: The polymer blend of any one of Embodiments A to F, wherein the propylene impact copolymer comprises from 70 to 90 wt. % polypropylene homopolymer and from 10 to 30 wt. % an ethylene-propylene copolymer based on the weight of the propylene impact copolymer; and the ethylene-propylene copolymer comprises propylene-derived units and from 30 to 60 wt. % units derived from ethylene and/or $C_4$ to $C_{12}$ α-olefins based on the weight of the ethylene-propylene copolymer.

Embodiment H: The polymer blend of any one of Embodiments A to G, wherein the propylene impact copolymer has an MFR at 190° C./2.16 kg of at least 2 g/10 min.

Embodiment I: The polymer blend of any one of Embodiments A to H, wherein the propylene impact copolymer has an MFR at 190° C./2.16 kg of from 2 g/10 min to 10.0 g/10 Min.

Embodiment J: The polymer blend of any one of Embodiments A to I, wherein the second elastomeric component comprises a propylene-based elastomer containing 75 to 97 wt. % of propylene-derived units and from 3 to 25 wt. % of ethylene and/or $C_4$-$C_{20}$ α-olefin derived units and has an mm propylene triad tacticity of at least 75%, and a heat of fusion of less than 75 J/g.

Embodiment K: The polymer blend of any one of Embodiments A to J, wherein the propylene-based elastomer is a propylene-ethylene copolymer having a melt flow rate at 230° C./2.16 kg of at least 1.0 g/10 min.

Embodiment L: The polymer blend of any one of Embodiments A to K, wherein the propylene-based elastomer is a propylene-ethylene copolymer having a melt flow rate at 230° C./2.16 kg of from 2.0 g/10 min to 50.0 g/10 min.

Embodiment M: The polymer blend of any one of Embodiments A to L, wherein the propylene-based elastomer is a propylene-ethylene copolymer having a melt flow rate at 230° C./2.16 kg of at least 8.0 g/10 min.

Embodiment N: The polymer blend of any one of Embodiments A to M, wherein the propylene-ethylene copolymer has the melt flow rate at 230° C./2.16 kg of from 10.0 to 50.0 g/10 min.

Embodiment O: The polymer blend of any one of Embodiments A to N, wherein the second elastomeric component comprises an ethylene-based plastomer containing 65 to 95 wt. % ethylene-derived units and from 5 to 35 wt. % 1-butene, 1-hexene, and/or 1-octene derived units based on the weight of the ethylene-based plastomer.

Embodiment P: The polymer blend of any one of Embodiments A to 0, wherein at least a portion of the second elastomeric component is present in the continuous phase.

Embodiment Q: The polymer blend of any one of Embodiments A to P having a gloss at 60°, as measured according to method ISO7668, of greater than 75, and of at least 5% higher than the gloss of the propylene impact copolymer.

Embodiment R: The polymer blend of any one of Embodiments A to Q, having a gloss at 60°, as measured according to method ISO7668, of greater than 85.

Embodiment S: The polymer blend of any one of Embodiments A to R, having a gloss at 60°, as measured according to method ISO7668, of greater than 90.

Embodiment T: The polymer blend of any one of Embodiments A to S comprising dispersed particles of the first elastomeric component having a smaller average particle size than that in the propylene impact copolymer.

Embodiment U: A polymer blend comprising, based on the weight of the polymer blend, (a) 75 to 99 wt. % of a propylene impact copolymer; and (b) 1 to 25 wt. % of propylene-based elastomer, wherein the propylene impact copolymer comprises polypropylene homopolymer and from 10 to 30 wt. % an ethylene-propylene copolymer based on the weight of the propylene impact copolymer, and the ethylene-propylene copolymer comprises propylene-derived units and from 30 to 60 wt. % units derived from ethylene and/or $C_4$ to $C_{12}$ α-olefins based on the weight of the ethylene-propylene copolymer; wherein the propylene-based elastomer comprises from 75 to 97 wt. % propylene derived units and from 3 to 25 wt. % ethylene derived units based on the weight of the propylene-based elastomer, and has an mm propylene triad tacticity of at least 75%, and a heat of fusion of less than 75 J/g, and an melt flow rate at 230° C./2.16 kg of greater than 3.0 g/10 min; and wherein the interfacial tension between the propylene impact copolymer and the propylene-based elastomer is of at least 1.2 mN/m.

Embodiment V: A polymer blend comprising, based on the weight of the polymer blend, (a) 75 to 99 wt. % of a propylene impact copolymer; and (b) 1 to 25 wt. % of propylene-based elastomer, wherein the propylene impact copolymer comprises polypropylene homopolymer and from 10 to 30 wt. % an ethylene-propylene copolymer based on the weight of the propylene impact copolymer, and the ethylene-propylene copolymer comprises propylene-derived units and from 30 to 60 wt. % units derived from ethylene and/or $C_4$ to $C_{12}$ α-olefins based on the weight of the ethylene-propylene copolymer; wherein the propylene-based elastomer comprises from 75 to 97 wt. % propylene derived units and from 3 to 25 wt. % ethylene derived units based on the weight of the propylene-based elastomer, and has an mm propylene triad tacticity of at least 75%, and a heat of fusion of less than 75 J/g; and wherein the interfacial tension between the propylene impact copolymer and the propylene-based elastomer is of at least 2.0 mN/m.

Embodiment W: The polymer blend of any one of Embodiments U or V, wherein the interfacial tension between the propylene-based elastomer and the propylene impact copolymer is of at least 4.5 mN/m.

Embodiment X: The polymer blend of any one of Embodiments U to W, wherein the propylene-based elastomer has a melt flow rate at 230° C./2.16 kg of from at least 1.0 g/10 min.

Embodiment Y: The polymer blend of any one of Embodiments U to X, wherein the propylene-based elastomer has a melt flow rate at 230° C./2.16 kg of from 10.0 g/10 to 50.0 g/10 min.

Embodiment Z: The polymer blend of any one of Embodiments U to Y having a gloss at 60°, as measured according to method ISO7668, of greater than 85.

Embodiment AA: A method of improving the gloss of a propylene impact copolymer, comprising the steps of: (a) providing a propylene impact copolymer comprising a propylene component present in continuous phase and a first elastomeric component present in disperse phase; and (b) blending and melting a second elastomeric component with the propylene impact copolymer to form a polymer blend; wherein the interfacial tension between the propylene impact copolymer and the second elastomeric component is at least 2.7 mN/m.

Embodiment AB: A method of improving the gloss of propylene impact copolymers, comprising the steps of: (a) providing a propylene impact copolymer comprising a polypropylene homopolymer and from 10 to 30 wt. % of an ethylene-propylene copolymer based on the weight of the propylene impact copolymer, and the ethylene-propylene copolymer comprises propylene-derived units and from 30 to 60 wt. % units derived from ethylene and/or C4 to C12 α-olefins based on the weight of the ethylene-propylene copolymer; (b) blending and melting a propylene-based elastomer with the propylene impact copolymer to form a polymer blend, wherein the propylene-based elastomer comprises from 75 to 97 wt. % propylene derived units and from 3 to 25 wt. % ethylene derived units based on the weight of the propylene-based elastomer, and wherein the propylene-based elastomer has an mm propylene triad tacticity of at least 75% and a heat of fusion of less than 75 J/g, wherein if the propylene-based elastomer has a melt flow rate of at least 3.0 g/10 min at 230° C./2.16 kg, then the interfacial tension between the propylene-based elastomer and the propylene impact copolymer is at least 1.2 mN/m, and if the propylene-based elastomer has a melt flow rate less than 3.0 g/10 min, then the interfacial tension between the propylene-based elastomer and the propylene impact copolymer is at least 2.0 mN/m.

Embodiment AC: The method of any one of Embodiments AA or AB, wherein the interfacial tension between the propylene-based elastomer and the propylene impact copolymer is of at least 4.5 mN/m.

Embodiment AD: The method of any one of embodiments AA to AC, wherein the polymer blend comprises from 75 to 99 wt. % of the propylene impact copolymer and from 1 to 25 wt. % of the second elastomeric component.

Embodiment AE: The method of any one of embodiments AA to AD, wherein the polymer blend has a gloss at 60°, as measured according to method ISO7668, is of at least 5% higher than the gloss of the impact copolymer.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

As used herein, the phrases "substantially no," and "substantially free of" are intended to mean that the subject item is not intentionally used or added in any amount, but may be present in very small amounts existing as impurities resulting from environmental or process conditions.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

We claim:

1. A polymer blend comprising:
   (a) a propylene impact copolymer comprising a polypropylene component present in a continuous phase and a first elastomeric component present in a disperse phase; and
   (b) a second elastomeric component, wherein the second elastomeric component comprises a propylene-based elastomer containing 75 to 97 wt. % of propylene-derived units and from 3 to 25 wt. % of ethylene and/or C4-C20 α-olefin derived units and has an mm propylene triad tacticity of at least 75%, and a heat of fusion of less than 75 J/g;
   wherein the interfacial tension between the second elastomeric component and the impact copolymer is at least 2.7 mN/m.

2. The polymer blend of claim 1, wherein the interfacial tension is at least 4.5 mN/m.

3. The polymer blend of claim 1 comprising from 75 to 99 wt. % of the propylene impact copolymer and from 1 to 25 wt. % of the second elastomeric component based on the weight of the polymer blend.

4. The polymer blend of claim 1 comprising from 85 to 97 wt. % the propylene impact copolymer and from 3 to 15 wt. % the second elastomeric component based on the weight of the polymer blend.

5. The polymer blend of claim 1, wherein the propylene impact copolymer comprises from 40 to 95 wt. % polypropylene homopolymer and from 5 to 60 wt. % an ethylene-propylene copolymer based on the weight of the propylene impact copolymer; and the ethylene-propylene copolymer comprises propylene-derived units and from 20 to 85 wt. % units derived from ethylene and/or C4 to C12 αolefins based on the weight of the ethylene-propylene copolymer.

6. The polymer blend of claim 1, wherein the propylene impact copolymer comprises from 70 to 90 wt. % polypropylene homopolymer and from 10 to 30 wt. % an ethylene-propylene copolymer based on the weight of the propylene impact copolymer; and the ethylene-propylene copolymer comprises propylene-derived units and from 30 to 60 wt. % units derived from ethylene and/or C4 to C12 α-olefins based on the weight of the ethylene-propylene copolymer.

7. The polymer blend of claim 1, wherein the propylene impact copolymer has an MFR at 190° C./2.16 kg of from 2.0 g/10 min to 10.0 g/10 min.

8. The polymer blend of claim 1, wherein the propylene-based elastomer is a propylene-ethylene copolymer having a melt flow rate at 230° C./2.16 kg of at least 1.0 g/10 min.

9. The polymer blend of claim 8, wherein the propylene-ethylene copolymer has the melt flow rate at 230° C./2.16 kg of from 10.0 to 50.0 g/10 min.

10. The polymer blend of claim 1, wherein the second elastomeric component comprises an ethylene-based plastomer containing 65 to 95 wt. % ethylene-derived units and from 5 to 35 wt. % 1-butene, 1-hexene, and/or 1-octene derived units based on the weight of the ethylene-based plastomer.

11. The polymer blend of claim 1, wherein at least a portion of the second elastomeric component is present in the continuous phase.

12. The polymer blend of claim 1 having a gloss at 60°, as measured according to method ISO7668, of greater than 75.

13. The polymer blend of claim 1 having a gloss at 60°, as measured according to method ISO7668, of greater than 85.

14. The polymer blend of claim 1, wherein the polymer blend comprises dispersed particles of the first elastomeric component having a smaller average particle size than that of the propylene impact copolymer.

* * * * *